United States Patent [19]
Ehlert et al.

[11] Patent Number: 5,133,234
[45] Date of Patent: Jul. 28, 1992

[54] OIL FILTER CUTTING DEVICE

[76] Inventors: Paul J. Ehlert, 2669 S. 1500 East, Salt Lake City, Utah 84106; John R. Ehlert, 3592 Flynn Cir., Salt Lake City, Utah 84109

[21] Appl. No.: 686,523
[22] Filed: Apr. 17, 1991
[51] Int. Cl.⁵ .......................... B23B 3/04; B23B 5/14
[52] U.S. Cl. ........................................ 82/92; 30/101; 30/418
[58] Field of Search .................. 82/92, 73; 30/97, 101, 30/418

[56] References Cited
U.S. PATENT DOCUMENTS

| | | | |
|---|---|---|---|
| 1,539,211 | 5/1925 | Scruggs | 30/418 |
| 2,189,341 | 2/1940 | Dumont | 30/101 X |
| 3,520,218 | 7/1970 | Tolkmitt | 82/92 |

Primary Examiner—Z. R. Bilinsky

[57] ABSTRACT

A cutting device is provided for opening the container of a standard oil filter and comprises a rigid mounting frame; first and second support disks rotatably mounted to the mounting frame, the first support disk including an outer edge which is roughened so as to frictionally grip the oil filter; a handle for rotating the first support disk; and an adjustable, rotating cutting blade, the cutting blade made adjustable by an advancing mechanism such as a screw. The first and second disks and cutting blade are disposed relative to each other so as to support the oil filter when the adjustable cutting blade is properly positioned. The oil filter is then rotated by the handle such that the cutting blade effectively separates the top and bottom portions of the oil filter.

6 Claims, 5 Drawing Sheets

OIL FILTER CUTTING DEVICE

BACKGROUND

1. Field

This invention relates generally to the opening of closed containers and more specifically to a device for removing the top end portion of a standard oil filter container.

2. Prior art

Over the years, as the motor vehicle industry has progressed technologically, filter media for lubricating oils used in vehicles, motors has progressed commensurately. Oil filters have become standardized, and as such, are mass produced by a number of different manufacturers and are available for purchase in virtually every retail outlet equipped with automotive products. It has become standard practice, upon changing the oil in a motor vehicle, to also change the oil filter. Because filters are standardized, this usually involves only unscrewing the used filter from a position adjacent the vehicle's engine block and replacing it with a new filter.

A standard oil filter comprises a filter element constructed of a paper-like material, the element being housed in a closed container. The container generally has a cylindrical shape, one end portion being constructed of a relatively heavy material such as steel and the other end portion and cylindrical portion being constructed of a lighter alloy of steel. The end portion constructed of the heavier steel has a threaded aperture drilled through approximately the center thereof, this aperture being the means of both attachment to the engine block and communication with the oil to be filtered.

Until recently, no interest has been expressed in opening the oil filter container to remove the filter element. Rather, once the filter had served its purpose and was no longer usable, the entire filter was discarded into standard trash receptacles. Ultimately, the used filter came to rest in a landfill or garbage dump, where decomposition takes an inordinately long period of time. Also, the used oil left in the filter tends to percolate into the groundwater, which has adverse effects on the environment.

With the advent of increasing environmental awareness, greater interest has been expressed in properly disposing of used oil filters. It seems clear that the metals from which the filter container are constructed are recyclable if properly separated from the paper-like filter. Further, once the container has been removed, the filter element can then be better disposed of by incineration or some other environmentally acceptable means.

However, there currently exists no desirable method or device for opening oil filter containers in order to separate the filter element from the metallic container. Devices and methods are known which have been designed for other purposes and then adapted for this purpose, but each of these falls short of what would be ideal.

An example of prior art devices which have been adapted for the use mentioned above is a standard pipe cutter. This device comprises a generally C-shaped support member having disk-shaped blades attached to either free end which rotate in a direction transverse to the long axis of the pipe or other object to be cut. A screw or similar advancing implement brings the blades closer together as the device is rotated around the object.

While functioning quite well in the context in which it was designed, a standard pipe cutter is not a desirable tool to be used when opening an oil filter. Because of the lightness of the material of which the container portion is constructed, a pipe cutter will not cut through the center of the filter. Rather, the container will collapse much as an aluminum soda pop can is collapsed after use.

Another example of prior art devices which could be adapted for opening sealed oil filter containers is a standard can opener known as a "sidewinder." This device is most commonly used to open cans containing food items or the like. Such cans have a distinct lip about the circumference of each end portion, which lip the "sidewinder" can opener grasps onto to make the appropriate cuts in the can. Because the standard oil filter does not have a lip, as do common food cans, there is little or nothing for the "sidewinder" can opener to grasp. This causes undue slippage of this type of can opener when attempting to use it in the context of opening oil filter containers.

More recently, a type of opener has been developed in which two set points hold the heavier end of the container, while a movable, rotating cutting disk is placed against the container to form a three point system which secures the container. The cutting disk punctures the side of the container near the heavier end. The container is then grasped by the operator and manually rotated to cut the heavier end off of the remainder of the container. While substantially more desirable than either of the prior art devices mentioned, this device also has its disadvantages. Specifically, this device requires that the filter be rotated by hand. This is not only time consuming, dirty, and tedious, but possibly dangerous as well. If any part of the filter slips or if the operator's hands slip, serious cuts could result.

Therefore, it is apparent that a need exists for a device which opens oil filters in a safe and efficient manner and wherein the operator can use the device without having to handle the filter excessively.

BRIEF SUMMARY AND OBJECTS OF THE INVENTION

Accordingly, it is principal object of the present invention to provide an oil filter cutting device for separating the top and bottom portions of a standard oil filter in order to better access the paper-like filter element contained inside.

Another major object is the provision of an oil filter cutting device, the use of which does not require excessive handling of the filter.

Another important objective of this invention is to provide an oil filter cutting device which operates in a save and efficient manner and saves time.

A still further object is the provision of an oil filter cutting device which is stably mounted to a work station.

Another significant objective is to provide an oil filter cutting device which is easily manufactured and operated, durable, relatively inexpensive, and transportable.

A further objective is to provide an oil filter cutting device which separates the top and bottom portions of a standard oil filter wherein the extent of resulting jagged edges is effectively minimized.

These and other objects are realized in a preferred embodiment of an oil filter cutting device comprising a rigid mounting frame; first and second support disks, each of which is rotatably mounted to the mounting frame, each support disk including a central axis of rotation and the first support disk further including an outer edge having a roughened surface for frictionally gripping the oil filter; a handle for rotating the first support disk about its central axis of rotation; and an adjustable, rotating cutting blade for separating the top and bottom portions of the oil filter, the cutting blade made adjustable by an advancing screw.

The first and second disks and cutting blade are disposed relative to each other so as to support the oil filter after the cutting blade has been adjusted by the advancing screw to indent or puncture the oil filter. The oil filter is then rotated by the handle one or more complete revolution until the cutting blade has completely separated the top and bottom portions of the oil filter.

DESCRIPTION OF THE DRAWINGS

The above and other objects, features and advantages of the invention will become apparent from a consideration of the following detailed description presented in connection with the accompanying drawings in which.

DETAILED DESCRIPTION

Reference is now made to the drawings wherein like numerals are used to denote like components throughout.

Figure 1:
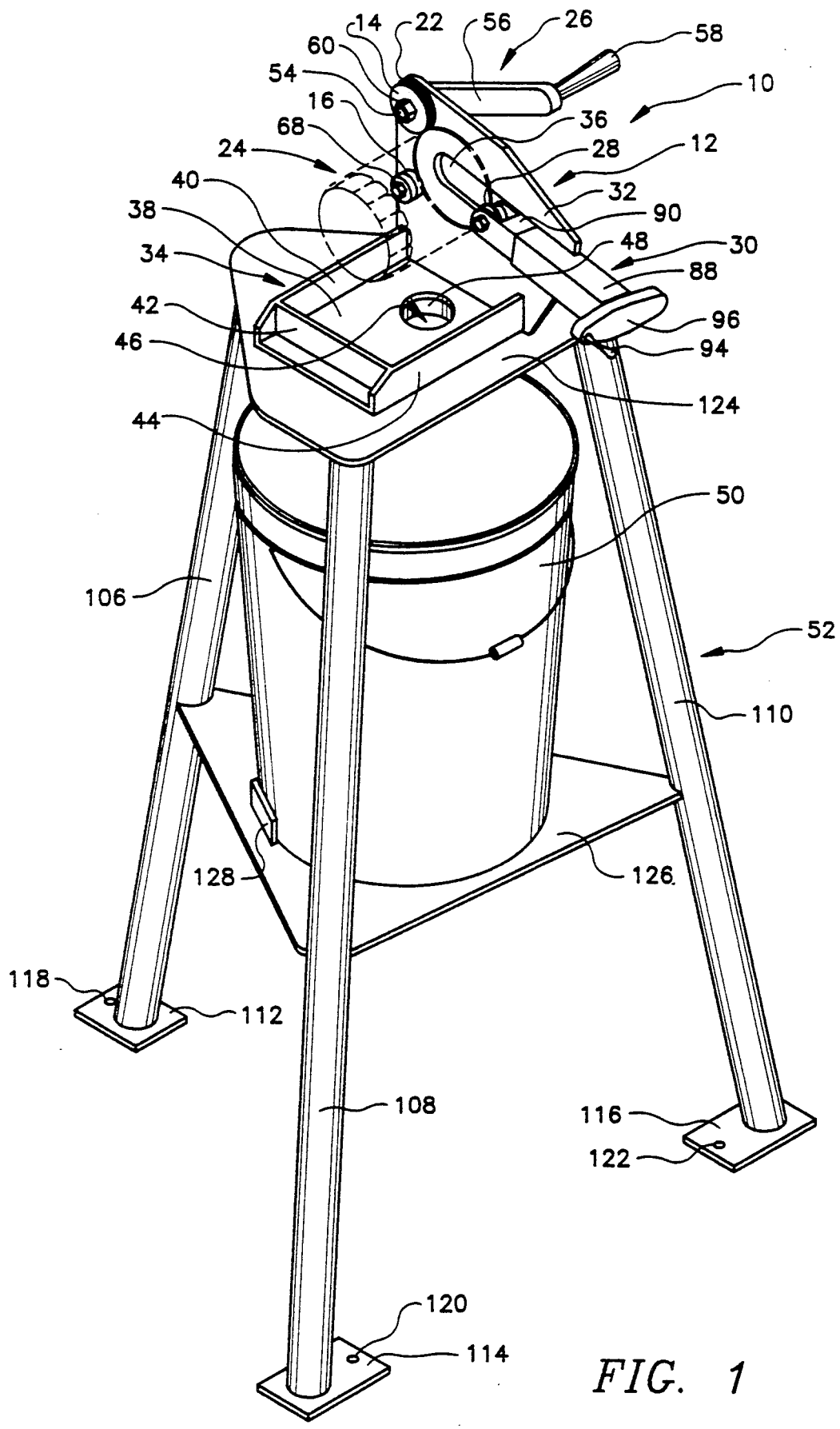
FIG. 1 is a perspective view of the preferred embodiment of an oil filter cutting device, according to the principles of the present invention, shown mounted to a separate three legged stand.

FIG. 1 illustrates a preferred embodiment of an oil filter cutting device, generally designated 10, which comprises a rigid mounting frame 12; a first support disk 14 and a second support disk 16 rotatably mounted to the mounting frame 10, each support disk 14 and 16 including a central axis of rotation, 18 and 20 respectively, and the first support disk 14 further including an outer edge 22 with a roughened surface for frictionally gripping the oil filter 24 to be cut, a handle assembly 26 for rotating the first support disk 14 about its central axis of rotation 18; and an adjustable, rotating cutting blade 28 mounted to the mounting frame 12, the cutting blade 28 made adjustable by an advancing screw assembly 30. Each of these components will be described hereinafter in greater detail.

The first and second disks, 14 and 16 respectively, and the cutting blade 28 are disposed relative to each other so as to support the oil filter 24. Once the oil filter 24 is properly positioned, it is rotated by manual rotation of the handle assembly 26 in combination with the roughened outer edge 22 of first support disk 14 as the cutting blade 28 separates the top and bottom portions of the oil filter 24.

The mounting frame 12 of the present invention comprises a vertical portion 32 and a horizontal portion 34. Vertical portion 32 of mounting frame 12 comprises generally a flat plate constructed of a heavy, rigid structural material, such as steel. Vertical portion 32 includes an oblong aperture 36 which allows room for protruding portions of the cutting blade assembly, as hereafter explained. Optionally, vertical portion 32 also includes a bonnet 35 which partially covers the first support disk 14. Mounted onto the vertical portion 32 of mounting frame 12 is the first support disk 14, the second support disk 16, and the advancing screw assembly.

Figure 3:
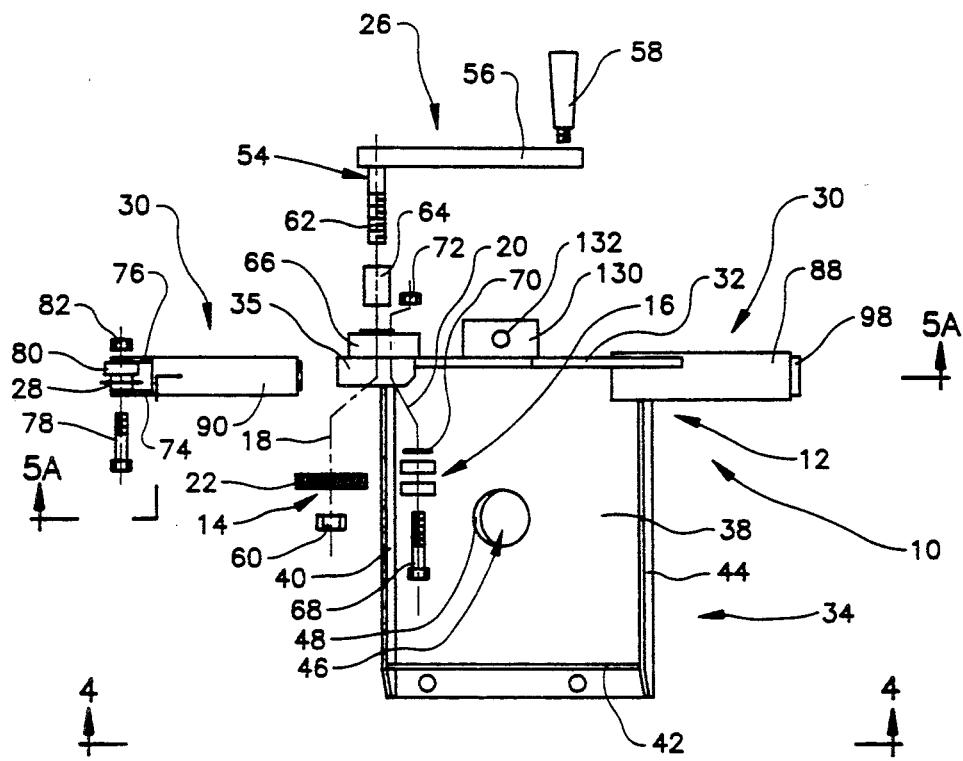
FIG. 3 is an exploded top plan view of the device of the present invention, shown in partial isolation.

The horizontal portion 34 of mounting frame 12 includes a base portion 38 and three rectangular side walls 40, 42, and 44. As best seen in FIGS. 1 and 3, base portion 38 includes an aperture 46 through which excess oil emanating from the oil filter being cut is drained. The side portions 40, 42, and 44 prevent spillage of the excess oil over the outer edges of base portion 38.

Figure 2:
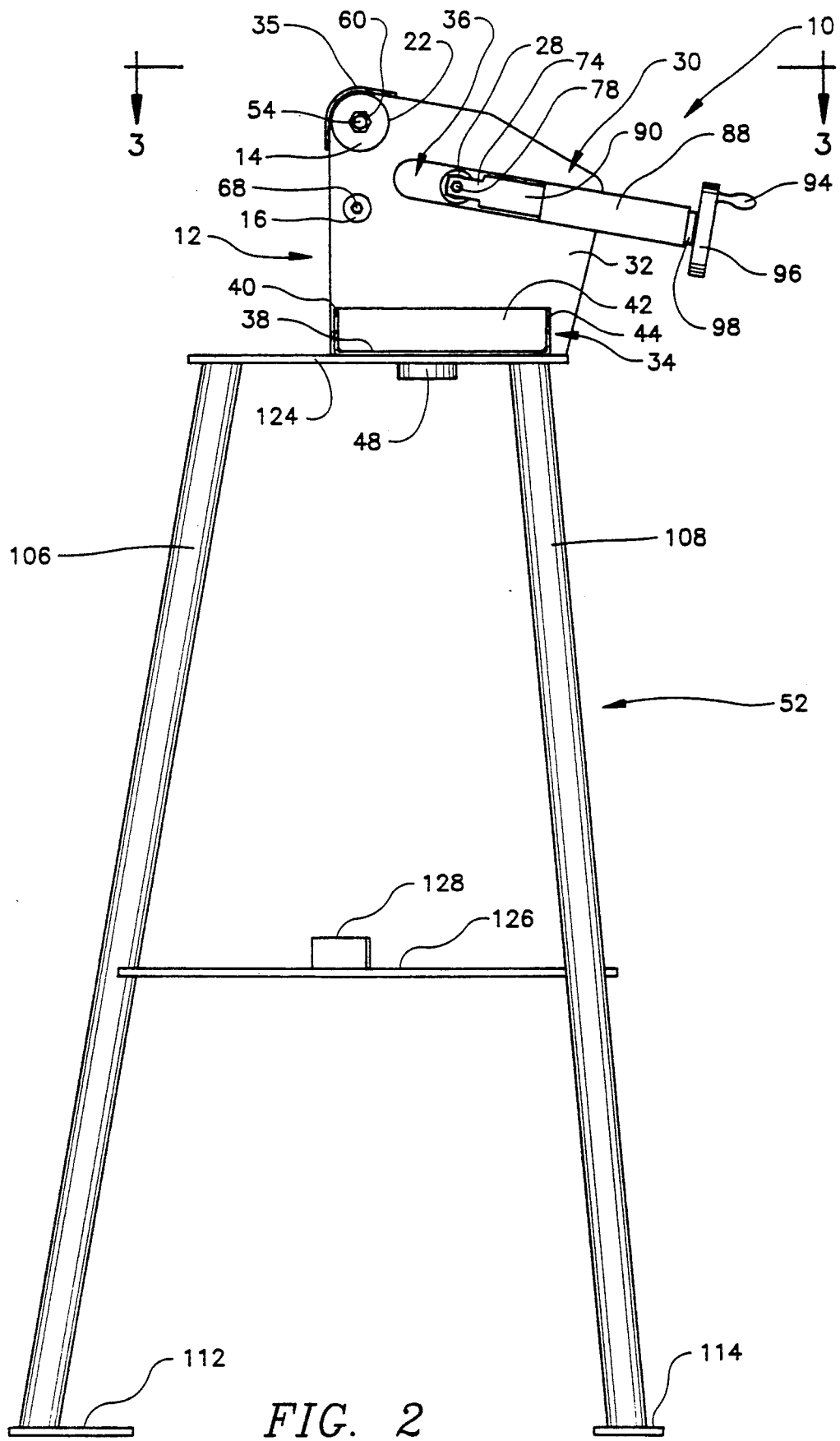
FIG. 2 is a side elevational view of the device and stand of FIG. 1.
Figure 4:
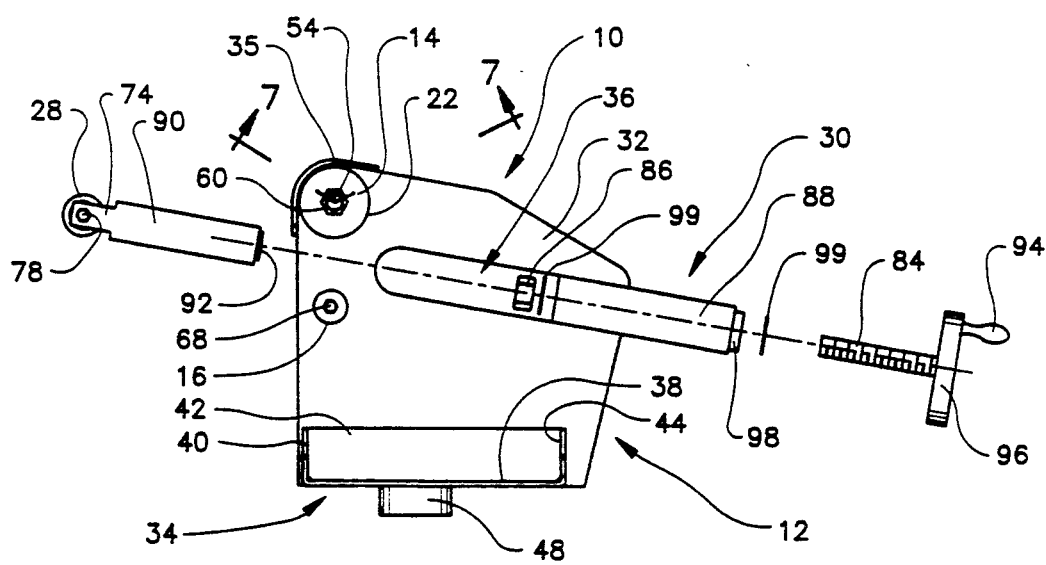
FIG. 4 is an exploded side elevational view of the invention.

Referring to FIGS. 2 and 4, aperture 46 advantageously includes a cylindrical flange 48 to assure proper directioning of the oil dripping through aperture 46. Preferably, this excess oil drips through aperture 46 into an overflow bucket 50, which is positioned on a stand 52, the device 10 being securely mounted thereto, as explained hereafter. Horizontal portion 34 is constructed of the same or similar material as vertical portion 32. As illustrated, horizontal portion 34 and vertical portion 32 are integrally connected, as by welding, so as to form one continuous piece.

Figure 7:
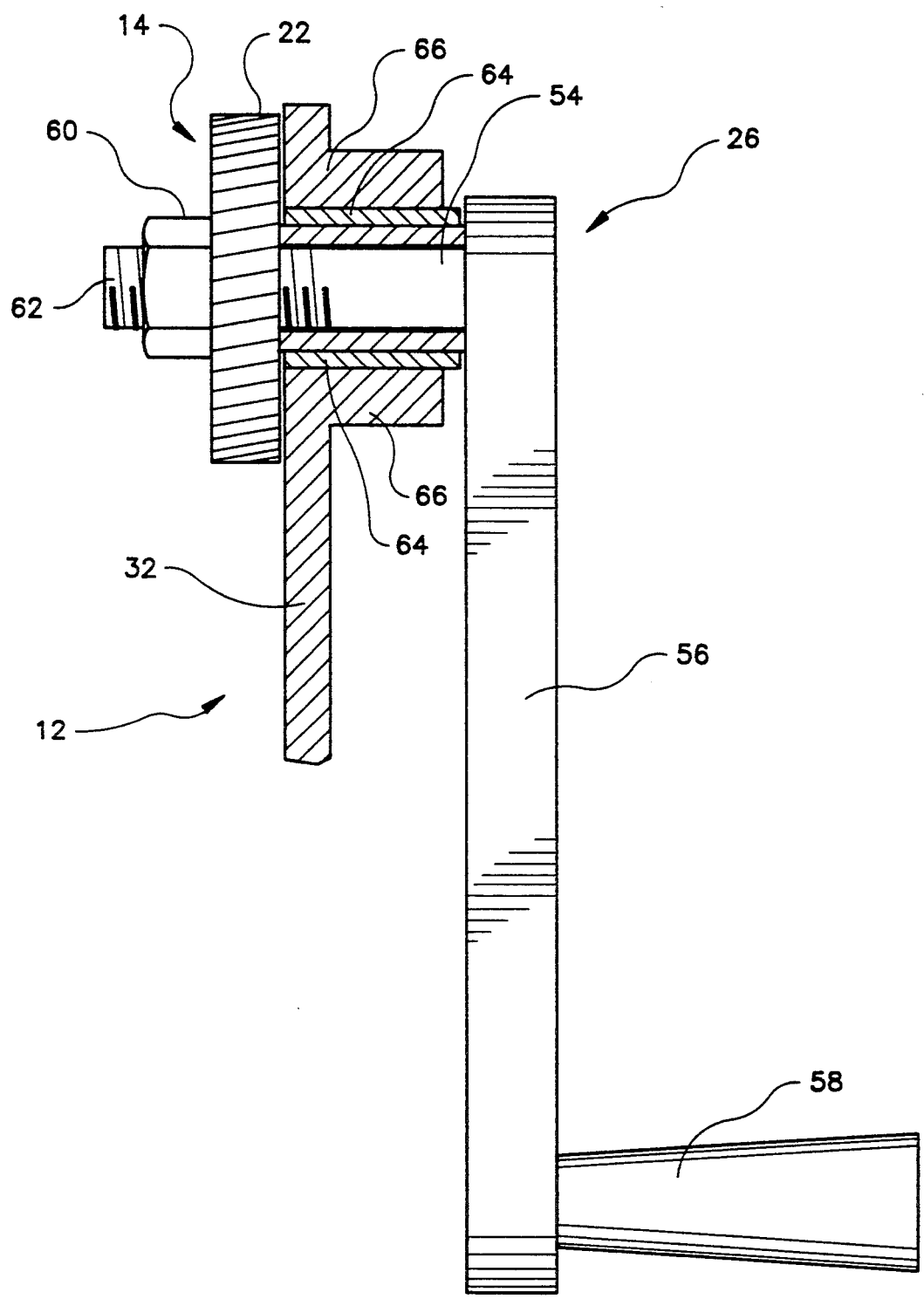
FIG. 7 is an enlarged isolated cut-away elevational view of the handle mechanism.

FIGS. 1 through 3 and FIG. 7 illustrate best the first support disk 14 and its correspondence with the handle assembly 26. Referring first to FIG. 7, the handle assembly 26 is shown to include a bolt 54 which passes rotatably through the vertical portion 32 of mounting frame 12 and which is fastened to first support disk 14, a moment arm 56 and a handle 58 for grasping. Advantageously, handle 58 is rotatably attached to the moment arm 56 in a manner that is well known in the industry.

Moment arm 56 is rigidly attached to the bolt 54. The first support disk 14 is held in place by a nut 60 which is internally threaded, the bolt 54 having a correspondingly threaded end 62. Threaded end 62 of bolt 54 and the nut 60 in combination nonrotatingly attach the first support disk 14 to bolt 54, although it should be recognized that first support disk 14 may also be internally threaded.

FIG. 7 further shows a bushing 64 which facilitates rotation of the handle assembly 26 and first support disk 14. Advantageously, a cylindrical flange 66 provides a greater distance wherein to seat the bushing 64 and further provides a distance between the handle assembly 26 and mounting frame 12 to prevent contact therebetween. As best seen in FIGS. 1 and 3, first support disk 14 has an outer edge 22 which is roughened in order to provide increased frictional gripping of the oil filter 24 as it is rotated by the handle assembly 26 during cutting.

The second support disk 16, best shown in FIGS. 2 through 4, is disposed directly beneath the first support disk 14. As with the first support disk 14, the second disk 6 is mounted to the vertical portion 32 of mounting frame 12. Referring next to FIG. 3, a bolt 68 is shown to pass through second support disk 16, which may actually be more than one disk, as shown.

A washer 70 spaces second support disk 16 from the vertical portion of mounting frame 12. Bolt 68 passes through second disk 16, washer 70 and the vertical portion 32 of mounting frame 12 and is held in place by a nut 72, thus allowing rotation about its central axis of rotation 20. Second support disk 16 is preferably a low friction rotational implement such as a standard annular ball bearing. Disk 16 serves as an anchor point to hold the oil filter 24 in place during the cutting procedure.

Figure 5B:
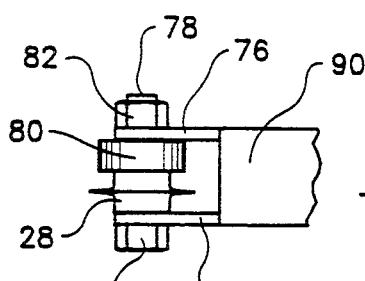
FIG. 5B is an enlarged isolated cut-away top plan view of the mechanism of FIG. 5A illustrating a rotating cutting blade.

The cutting blade 28 is rotatably attached to the advancing screw assembly 30 such that cutting blade 28 can be advanced and retracted as desired and needed. As best seen in FIG. 5B, advancing screw assembly 30 includes at one end two parallel tabs 74 and 76. Each of the tabs 74 and 76 includes aligned apertures, not shown, the aperture in tab 76 being threaded.

A bolt 78 is first passed through the aperture in parallel tab 74 before being inserted into an aperture, not shown, in the center of the cutting blade 28. Bolt 78 continues through a centrally disposed aperture in a support disk 80, also not shown, before passing through the aperture in parallel tab 76 and being secured in place by a nut 82. Because the aperture in tab 76 is threaded, it will be easily recognized by one skilled in the art that bolt 78 is thereby prevented from rotation.

Support disk 80 is preferably a ball bearing identical or substantially similar to second support disk 16. Importantly, support disk 80 can also serve to hold the oil filter 24 in place as the adjacently disposed cutting blade 28 separates the bottom portion from top portion.

Figure 5A:
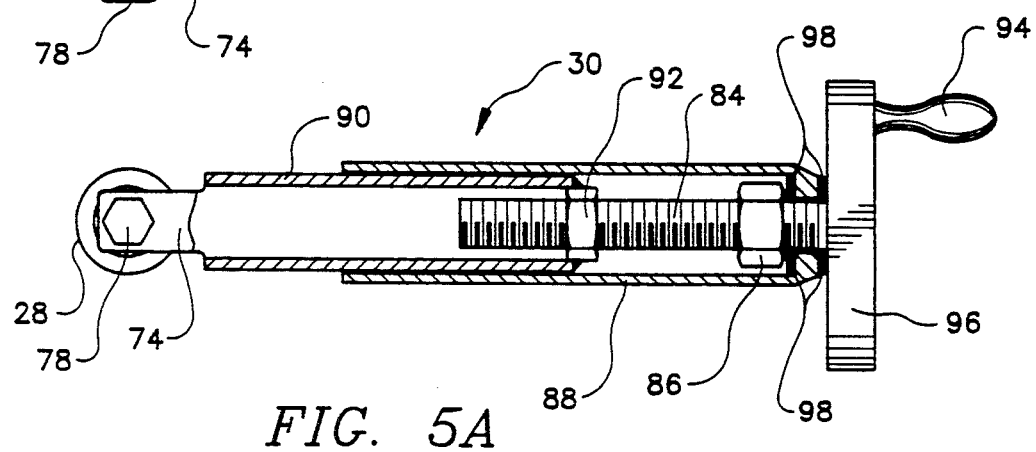
FIG. 5A is an enlarged isolated side elevational view in cut-away of the preferred advancing mechanism of the present invention.

A preferred embodiment of the advancing screw assembly 30 is shown in FIGS. 5A and 5B. This embodiment comprises the advancing screw 84, a lock nut 86, both of which are contained within a hollowed structural portion 88, which is integrally attached, as by welding, to the vertical portion 32 of mounting frame 12. Advancing screw assembly 30 further comprises a moving body 90 to which parallel tabs 74 and 76 are integrally attached, the moving body 90 including at its opposite end a nut 92, or a similar threaded aperture, which is integrally attached thereto and through which the advancing screw 84 passes.

Advancing screw 84 passes through the distal end of structural portion 88, where it is rigidly attached to a moment arm 96, the moment arm 96 including a handle 94 for rotating the advancing screw 84 to advance or retract the cutting blade 28. The lock nut 86 and the moment arm 96 combine to prevent dislodgement of the screw 84 from the structural portion 88. Optionally, a bushing 98 facilitates rotation of the advancing screw 84 at the distal end of structural portion 88. Another option would be to provide washers 99 in place of the bushing 98, although the assembly 30 would function properly without either a bushing or washers.

Figure 6B:
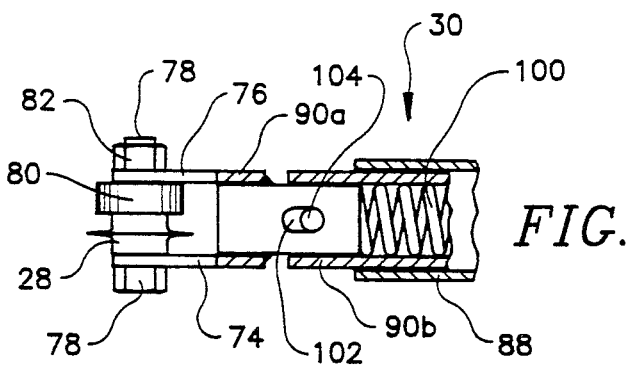
FIG. 6B is an enlarged isolated cut-away top plan view of the alternative embodiment of FIG. 6A.
Figure 6A:
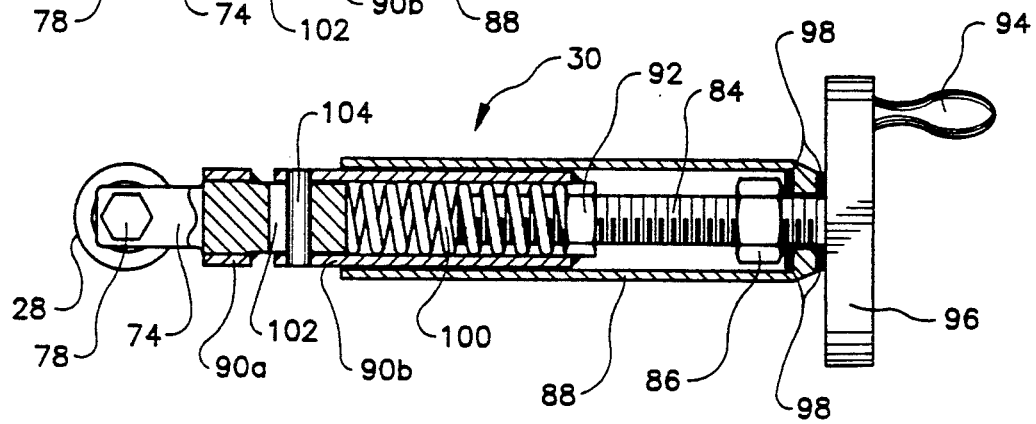
FIG. 6A is an alternative embodiment of the advanced mechanism, similar to FIG. 5A.

An alternative embodiment to that shown in FIGS. 5A and 5B is shown in FIGS. 6A and 6B. This alternative embodiment illustrates inclusion of a coil spring 100 which biases separated moving bodies 90a and 90b. FIGS. 6A and 6B illustrate a slot 102 through which a pin 104 extends. Pin 104 holds separated moving bodies 90a and 90b together as they are biased apart from each other by the coil spring 100. Other than the separation of moving body 90 into separated moving bodies 90a and 90b and inclusion of an oblong slot 102 through which the pin 104 extends, the advancing screw assemblies 30 shown in FIGS. 5A and 5B and FIGS. 6A and 6B are identical. As best shown in FIG. 1, bolt 78 and nut 82 extends into the oblong aperture 36, the aperture 36 being provided to prevent contact of bolt 78 and nut 82 with vertical portion 32 of mounting frame 12 during advancement of the cutting blade 28.

The stand 52, illustrated in FIGS. 1 and 2, is a convenient method of mounting the device 10 to a work station. As shown, the preferred stand 52 comprises three elongate legs 106, 108, and 110 arranged in pyramid fashion. Each leg 106, 108 and 110 is shown to have a base 112, 114, and 116, respectively, these bases for providing a firm and level support for the device 10. Advantageously, each base 112, 114, and 116 comprises an aperture 118, 120, and 122, respectively, each aperture for receiving a bolt, not shown, to rigidly affix the stand 52 to the ground or floor.

Stand 52 comprises further two horizontal shelf portions 124 and 126, the top shelf 124 having attachment points for each of the legs 106, 108, and 110. Similarly, middle shelf 126 is disposed between and attached to each of the legs 106, 108, and 110 and provides support therefor. Optionally, a vertical tab 128 is attached to middle shelf 126 and serves to hold an overflow bucket or pail 50 into which excess oil from the oil filters 24 is drained. There may be one, two, or three tabs 128 disposed in appropriate locations on middle shelf 126, as needed.

Mounting frame 12 may include a tab 130, illustrated in FIG. 3, which includes an aperture 132 through which a bolt, not shown, is passed to attach the device 10 to the stand 52.

In use, an oil filter 24 is placed flush against vertical portion 32 of mounting frame 12, as shown in FIG. 1, the oil filter 24 being in contact with first support disk 14 and second support disk 16, which serve as anchor points. The cutting blade 28 is then advanced manually by the advancing screw assembly 30 until it likewise comes in contact with oil filter 24. The cutting blade 28 is advanced further until the oil filter 24 is punctured thereby. Support disk 80 then serves as a third anchor point to hold the filter 24 in place.

Handle assembly 26 is then rotated to cause rotation of the oil filter 24 about its central axis as it is held in place by first support disk 14, second support disk 16 and the cutting blade 28. Because outer edge 22 of first support disk 14 is roughened, oil filter 24 is frictionally gripped thereby to prevent slippage and provide rotation. Thus, the top end of oil filter 24 is cut off from the body and bottom end thereof as the handle 26 is rotated.

Screw assembly 30 is then retracted and a new oil filter 24 may be placed into position. Oil dripping from the cut oil filter 24 drips into horizontal portion 34 of mounting frame 12 to further drip through aperture 46 and into the overflow bucket 50. In this manner, many oil filters may be opened in a short amount of time with relatively little exposure by the operator to the filters, thereby insuring safety and cleanliness.

While the invention has been described and illustrated in conjunction with the best currently known embodiments, it will be obvious to those skilled in the art that modifications and variations may be made in it without departing from the spirit of the invention as disclosed and the scope thereof as set forth in the following claims.

We claim:

1. A device for opening oil filters having top and bottom portions, the device comprising a rigid mounting frame, first and second support disks rotatably mounted to the mounting frame, the first and second support disks including a central axis of rotation and the first support disk further including an outer edge having means for frictionally gripping the oil filter, means for rotating the first support disk about its central axis of rotation, an adjustable, rotating cutting blade mounted to the mounting frame, the cutting blade made adjustable by advancing means, and a third support disk disposed adjacent to the cutting blade, wherein the first, second and third disks are disposed relative to each other so as to support the oil filter, and the oil filter is rotated by the means for rotating the first support disk in combination with the means for frictionally gripping the oil filter as the cutting blade separates the top and bottom portions of the oil filter.

2. A device for opening oil filters as in claim 1 wherein the advancing means is an advancing screw assembly.

3. A device for opening oil filters as in claim 2 wherein the advancing screw assembly includes a hollowed structural portion which is integrally attached to the mounting frame, an advancing screw, a lock nut, the advancing screw and lock nut being contained within the hollowed structural portion, a moving body including a threaded aperture through which the advancing screw passes, and a moment arm including a handle for rotating the advancing screw to advance the cutting blade.

4. A device for opening oil filters as in claim 1 wherein the means for frictionally gripping the oil filter is a roughened surface.

5. A device for opening oil filters as in claim 1 wherein the means for rotating the first support disk is a handle assembly.

6. A device for opening oil filters as in claim 5 wherein the handle assembly includes a bolt which passes rotatably through the mounting frame, a moment arm rigidly attached to the bolt, and a handle for grasping which is rotatably attached to the moment arm.

* * * * *